Nov. 16, 1965    E. S. HIBYAN ETAL    3,217,811
ROTOR HEAD FAIRING FOR HIGH SPEED VEHICLE
Filed Dec. 16, 1964    2 Sheets-Sheet 2

INVENTORS
EDWARD S. HIBYAN
LUIGI VACCA
BY Jack N. M. Carthy
AGENT

United States Patent Office

3,217,811
Patented Nov. 16, 1965

3,217,811
ROTOR HEAD FAIRING FOR HIGH
SPEED VEHICLE
Edward S. Hibyan and Luigi Vacca, Milford, Conn., assignors to United Aircraft Corporation, East Hartford, Conn., a corporation of Delaware
Filed Dec. 16, 1964, Ser. No. 418,738
15 Claims. (Cl. 170—160.56)

This invention relates to a fairing for a rotor head.

An object of this invention is to provide a rotor head located externally of an aircraft with a fairing having a near optimum aerodynamic shape without having excessively large cutouts for blade motion.

Another object of this invention is to provide a fairing which will protect a rotor head including its associated operating mechanism against weather damage.

A further object of this invention is to provide a rotor head fairing which will improve the top speed capabilities of an aircraft and increase fuel economy.

Another object of this invention is to provide a rotor head fairing which will produce a reduction in drag of the rotor head.

A further object of this invention is to reduce turbulence behind the rotor head and thereby reduce aircraft vibrations.

Another object of this invention is to provide a rotor head fairing which is attached to the rotor head rather than to the blades or other structure of the main body.

A further object of this invention is to provide a rotor head fairing which, while not supported by the blades, will move in a lag-lead direction with the blades.

Another object of this invention is to provide a fairing for a rotor head wherein one portion of said fairing is fixed to said rotor head while another portion is mounted thereon for movement in a lag-lead direction.

A further object of this invention is to provide a connection between the blades and fairing so that the fairing will move with lag-lead movements of the blades.

Another object of this invention is to provide a fairing with blade cutouts having a section of each cutout with a frangible material which reduces the cutout to a size to permit normal flight blade motion. A movement which would extend out of this normal range would crush the frangible material and permit the blade to move into its desired position without overstressing the blade.

A further object of this invention is to have a fixed portion of a fairing fixedly attached to the top of the rotor head and have a movable portion supported by the drag hinge by a lever which transmits lag-lead motions of the blade to the cooperating portion of the fairing.

Other objects and advantages will be apparent from the specification and claims, and from the accompanying drawings which illustrate an embodiment of the invention.

FIGURE 3 is an enlarged view of one of the supporting and actuating levers for one portion of the rotor head fairing.

Figure 1:
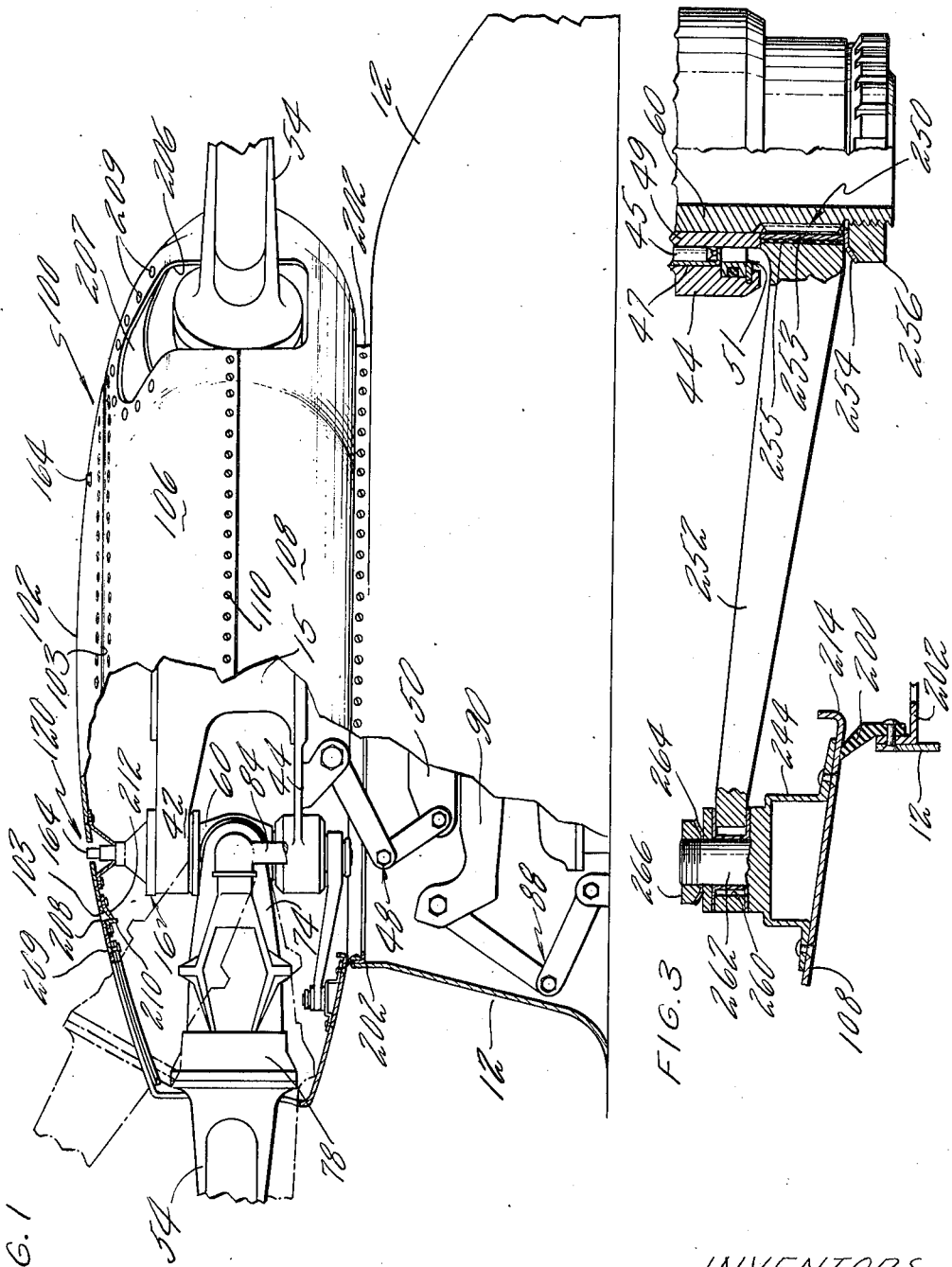
FIGURE 1 is a side view, partially in section, of a rotor system including a rotor head with a rotor fairing incorporating the invention.
Figure 2:
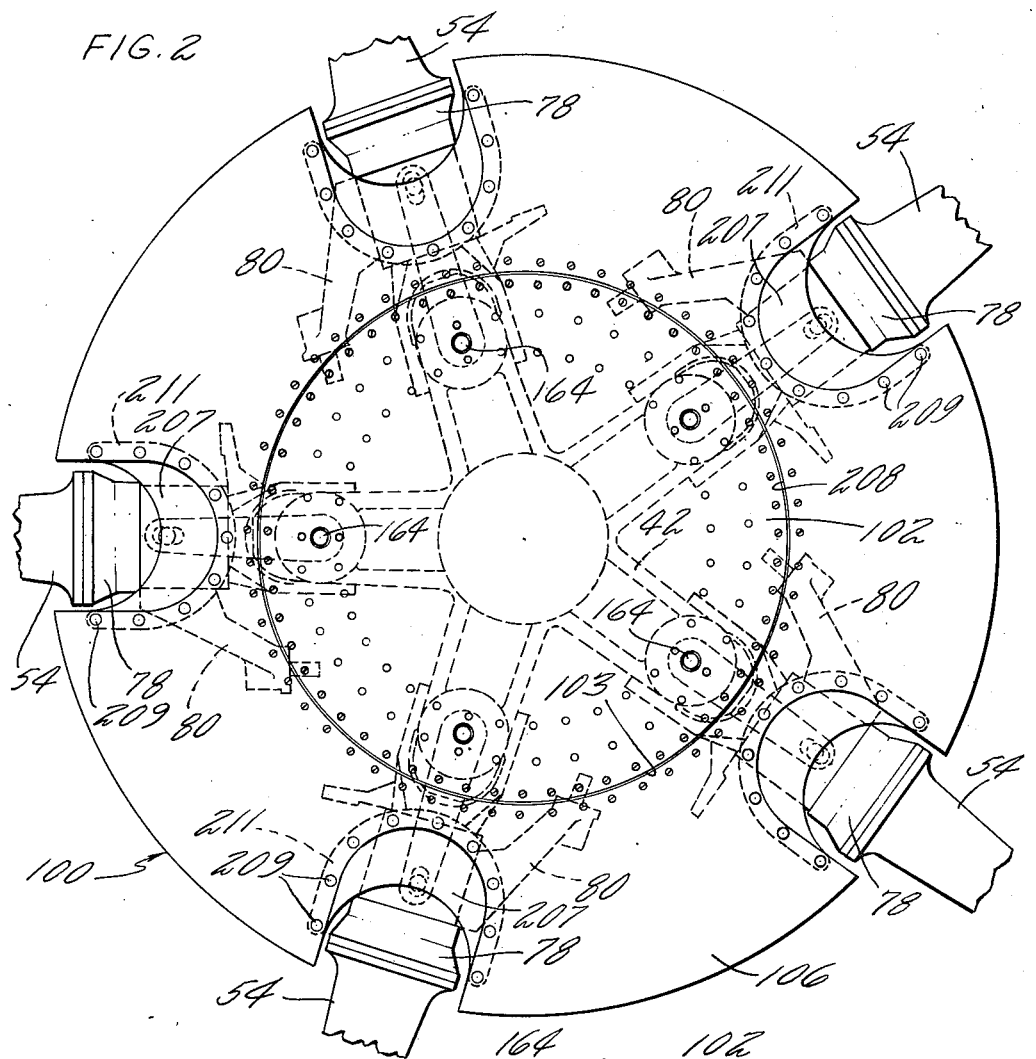
FIGURE 2 is a top view of the rotor head and fairing including the invention.

Referring to FIGURE 1, this figure shows the top portion of an aircraft with a pylon 12 extending therefrom with a rotor generally indicated at 16 faired in with the pylon. The rotor 16 is constructed similar to the rotor shown in U.S. Patent No. 2,774,553. The rotor head of the rotor 16 consists of an upper plate 42 and lower plate 44 spaced by a hub 15 and supported on a shaft, not shown. The plates 42 and 44 are formed having a like number of arms extending therefrom in a symmtrical manner. The arms of the respective plates are located over each other and each cooperating pair form a support for a drag hinge 60 of each blade. The upper portion of each drag hinge 60 is supported within its cooperaing arm of plate 42 to permit rotation but is restrained against axial movement. The lower portion of each drag hinge 60 extends through the cooperating arm of lower plate 44 for a purpose to be hereinafter described. Where each drag hinge 60 extends through the lower plate 44, it is mounted for relative rotational movement. Roller bearings 45 are shown between an outer race 47 fixed to the lower plate 44 and an inner race 49 fixed to the drag hinge 60. A conventional seal 51 is shown held retained by a snap ring to maintain lubricant within the bearing area.

Each vertical drag hinge 60 has a transverse passage, the axis of which intersects its own vertical axis. In this passage there is journaled a flapping hinge onto which a flapping link 74 is mounted. The outer free end of each flapping link 74 is formed having a blade attaching sleeve 78 journaled thereon for rotation to vary the pitch of the blade. A rotor blade 54 has its root end fixedly connected to the free end of each of the blade attaching sleeves. A blade pitch changing horn 80 is connected with each sleeve for actuating said sleeve. The free end of each blade pitch changing horn 80 is connected to a push-pull rod 84 which extends thereon to an actuator, not shown. Manual or automatic means can control one or more of the push rods 84 to obtain specific movement of the blades.

The lower plate 44 is connected by a scissors arrangement 48 to the upper rotating swashplate 50. This is to maintain their rotation together. The main body of the fuselage is connected by a scissors arrangement 88 to the stationary swashplate member 90. The scissors 88 permits tilting movement of the swashplate 90 but fixes it against rotation with respect to the fuselage. While a specific rotor head has been discussed, it is to be understood that this invention can be used with other types of rotor heads.

The rotor head 16 just described is enclosed by a fairing arrangement 100 which is made up of (1) a removable fairing maintenance dome 102 which is releasably fixed to the rotor head against any type of movement, (2) a main body portion which is fixed to the rotor head to allow rotation relative thereto and encloses the rotor head between the outer circumference of the dome 102 and the pylon 12, this portion is formed having an upper section 106 and a lower section 108, and (3) a frangible section for each cutout for the mounting of a blade formed by the two portions 106 and 108.

Figure 4:
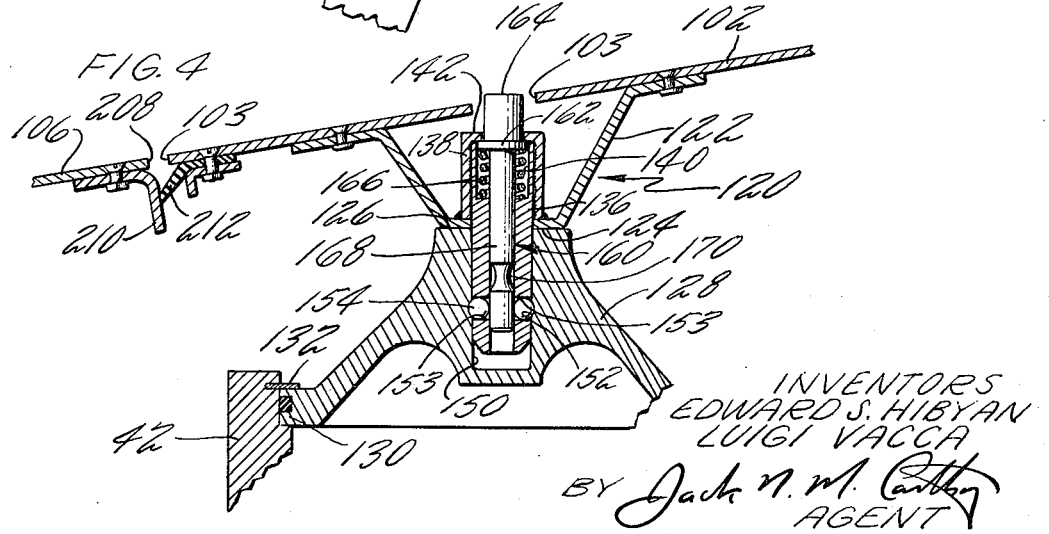
FIGURE 4 is an enlarged view of the fixed support for the other portion of the rotor head fairing.

The removable fairing dome 102 having a circular edge 103 is centered over the rotor head 16 and attached thereto by quick attach-detach mechanisms 120 at a plurality of locations. In FIGURE 1, it is shown as being connected to each cap covering the upper end of each drag hinge. While a specific quick attach-detach mechanism 120 is shown (see FIG. 4 locked position), any satisfactory mechanism can be used. A circumferential structural member 122 is fixed to the inner side of the fairing dome 102 adjacent its outer edge and extends downwardly to provide an annular flat surface 124 to be used for connecting the fairing dome to the rotor head. In the modification shown, the flat annular surface 124 extends over the caps 128 located over the drag hinges and the caps have a flat surface 126 formed thereon which is arranged to mate with the flat surface 124. While each cap 128 can be fixed to the plate 42 by any means desired, it is shown as having an annular flange 130 held in a recess by a snap ring 132.

Each cap is connected to the circumferential structural member in the same way so only one connection will be described. The circumferential structural member 122 has a cylindrical member 136 extending therethrough for each cap 128 and affixed thereto adjacent its mid-point. A holding cap 138 is fixed around the upper end of cylindrical member 136. The top of the cylindrical member 136 is countersunk at 140 and the cap 138 has an inwardly extending flange 142 which extends inwardly over the upper end of the countersunk portion 140. Each cap 128 has a bore 150 therein for receiving the downwardly extending portion of its cooperating cylindrical member 136. An annular groove 152 extends around the inner surface of the opening for a purpose to be hereinafter described.

The side walls of the cylindrical member 136 have openings 153 therein on the same level for receiving balls 154. The openings are reduced in size at the outer surface of the cylindrical member so that the balls will not pass through, but merely protrude therefrom. An actuating member 160 is located within the cylindrical member and has a guide flange 162 which fits in the countersunk portion 140. A button 164 extends through the top of the cap 138 so that it can be reached for manual operation. Spring 166 extends between the flange 162 and the bottom of the countersunk portion 140 biasing the member 160 in its upper position. Actuating member 160 has a stem 168 with a groove 170 located therearound so that when the actuating member 160 is pressed downwardly and the groove 170 moves into a plane with the openings 153, the balls 154 will be permitted to move into the groove 170 and the connection will be unlocked.

The removable fairing dome 102 may be formed integral with the upper section 106 of the main body portion if it is not desired to have access to the top of the rotor head.

The main body portion of the fairing arrangement 100 covers the rotor head from the circular edge 103 of the fairing dome 102 to the annular seal 200 fixed to the annular flange 202 forming an opening in the top of the pylon 12. The main body portion includes an upper section 106 and a lower section 108. These upper and lower sections are fixed together where they meet by a plurality of screws 110. The patent to Michel et al., U.S. Patent No. 3,056,457, shows a rotor fairing having an upper and lower section.

The main body portion includes a cutout 206 for each blade location. The cutout is formed to permit flapping movement of the blades therein. The upper section 106 of the main body portion is positioned with a circular opening 208 located adjacent the circular edge 103 of the dome 102. An annular flange 210 is fixed to the upper portion 106 and forms an annular surface extending downwardly from the opening 208. An annular flexible sealing member 212 is fixed to the lower portion of the outer edge of dome 102, and this resilient seal forms a contact with the flange 210.

The lower section 108 of the main body portion is positioned with a circular opening 214 located just above the annular seal 200. The annular seal 200 engages the under surface of the lower section 108. The main body portion of the fairing is supported by the lower portion of each drag hinge 60 where it extends through the lower plate 44. Each extension of a drag hinge 60 is splined at 250 to receive a mated splined end of a lever 252 formed by a splined ring member 253 held in place in a circular opening in the end of the lever 252 by a thin band of resilient material 255. Each lever and cooperating drag hinge will then rotate together with angular variations between an extending blade and its cooperating extending lever 252 being permitted. It can be seen that this will permit the blade to have a small lag-lead movement with relation to a cooperating lever 252. A lock washer 254 and nut 256 are threadably engaged with the free end of each drag hinge and serve to retain the lever on the drag hinge. Each lever 252 extending out from its drag hinge is positioned so that it extends along the axis of the respective blade attached to that drag hinge.

The levers 252 are of such a length so that they extend over the edge forming the circular opening 214 and into the lower section 108 of the main body portion. The free end of each lever 252 has a longitudinally extending slot 260 which receives a pin member 262 which is fixed to the inside of the lower section 108. Each pin member 262 is shown as integrally fixed to a bracket 244 which is riveted to the lower section 108. A thrust washer is placed over the free end of each pin member 262 and the assembly is held in position by a lock washer 264 and nut 266. It can be seen that since the pivotal center of the lever is not the same as the pivotal center of the main body portion of the fairing, the sloppy link connection is necessary between the free end of the lever 252 and pin 262.

On starting, the portion of the fairing fixed to the levers 252 moves as the blades lag back against their lag stops and when the rotor reaches operating speed, the blades assume a very steady position in phase with one another and the fairing remains rather stationary. The reverse of this takes place on deceleration and stopping of the rotor. The above action occurs since as the blades move in the lag-lead direction, they rotate their drag hinges 60 which in turn move their respective levers 252 and since the fairing is supported on the free ends of the levers 252 the fairing will move in a direction dictated by the levers.

As the blades tend to flap, they are permitted a predetermined angular movement governed by the size of each cut-out 206. To allow for a maximum area of fairing, the top portion of each cutout 206 is faired in by a frangible member 207. This frangible member is held in place by a plurality of fasteners 209 and an edge member 211. This frangible member reduces the size of the cutout 206 to a size which permits normal flapping movement and which is aerodynamically beneficial. However, on certain types of maneuvers, the blades exceed this and flap a greater number of degrees until they are stopped by a flapping stop. In this case, the blade contacts the frangible member 207 and it would be deformed or crushed and permit the blade to flap. This member could be replaced upon the next return to a ground station.

The rotor head fairing can be structurally reinforced so that the blades will be kept in phase on the ground. However, if it is desired to keep the fairing light in weight, other means can be provided to maintain the blades in a relatively equally spaced position about the shaft.

It is to be understood that the invention is not limited to the specific description above or other specific figures, but may be used in other ways without departure from its spirit as defined by the following claims.

We claim:

1. In combination in an aircraft, a fuselage, a rotor head, means mounting said rotor head outwardly from said fuselage for rotation, rotor blades, said rotor head having members for blade attachment which have lag-lead movement therewith, means connecting a blade to each of said members for blade attachment, rigid fairing means enclosing said rotor head, said rigid fairing means having a cutout for each blade, means mounting said rigid fairing member on said rotor head against tilting relative to said fuselage, said mounting means including a connection which transmits lag-lead movement of said blades to said rigid fairing means whereby it is moved with said blades.

2. In combination in an aircraft, a fuselage, a rotor head, means mounting said rotor head outwardly from said fuselage for rotation, rotor blades, said rotor head having drag hinges for blade attachment which provides for lag-lead movement, means connecting a blade to each of said drag hinges for blade attachment, rigid fairing means enclosing said rotor head, said rigid fairing means having a cutout for each blade, means mounting said rigid fairing member on said drag hinges against tilting relative to said fuselage, said mounting means including a connection which transmits lag-lead movement of said drag hinges to said rigid fairing means whereby it is moved with said blades.

3. In combination in an aircraft, a fuselage, a rotor head, means mounting said rotor head outwardly from said fuselage for rotation, rotor blades, said rotor head having drag hinges for blade attachment which provide for lag-lead movement, means connecting a blade to each of said drag hinges for blade attachment, rigid fairing means enclosing said rotor head, said rigid fairing means having a cutout for each blade, means mounting said rigid fairing member on said drag hinges against tilting relative to said fuselage, said mounting means including a lever which is connected between several of said drag hinges and said rigid fairing means to transmit lag-lead movement of said drag hinges to said rigid fairing means whereby it is moved with said blades.

4. In combination in an aircraft, a fuselage, a rotor head, means mounting said rotor head outwardly from said fuselage for rotation, rotor blades, said rotor head having members for blade attachment which have lag-lead movement and flapping movement therewith, means connecting a blade to each of said members for blade attachment, rigid fairing means enclosing said rotor head, said rigid fairing means having a cutout for each blade to permit flapping movement, means mounting said rigid fairing member on said rotor head against tilting relative to said fuselage, said mounting means including a connection which transmits lag-lead movement of said blades to said rigid fairing means whereby it is moved with said blades.

5. In combination in an aircraft, a fuselage, a rotor head, means mounting said rotor head outwardly from said fuselage for rotation, a pylon extending from said fuselage to a location below said rotor head, rotor blades, said rotor head having members for blade attachment which have lag-lead movement therewith, means connecting a blade to each of said members for blade attachment, rigid fairing means enclosing said rotor head, said rigid fairing means having a cutout for each blade, means mounting said rigid fairing member on said rotor head against tilting relative to said fuselage, means sealing said rigid fairing means with said pylon, said mounting means including a connection which transmits lag-lead movement of said blades to said rigid fairing means whereby it is moved with said blades.

6. In combination in an aircraft, a fuselage, a rotor head, means mounting said rotor head outwardly from said fuselage for rotation, rotor blades, said rotor head having members for blade attachment which have lag-lead movement and flapping movement therewith, means connecting a blade to each of said members for blade attachment, rigid fairing means enclosing said rotor head, said rigid fairing means having a cutout for each blade to permit flapping movement, each cut-out being reduced in size by a frangible insert to permit normal flight flapping movements, said frangible insert breaking or deforming when engaged by a blade when flapping runs above normal limits, means mounting said rigid fairing member on said rotor head against tilting relative thereto, said mounting means including a connection which transmits lag-lead movement of said blades to said rigid fairing means whereby it is moved with said blades.

7. In combination in an aircraft, a fuselage, a rotor head, means mounting said rotor head outwardly from said fuselage for rotation, rotor blades, said rotor head having members for blade attachment which have lag-lead movement therewith, means connecting a blade to each of said members for blade attachment, rigid fairing means enclosing said rotor head, said rigid fairing means having a cutout for each blade, means mounting said rigid fairing member on said rotor head against tilting relative to said fuselage, said mounting means including a connection which transmits lag-lead movement of said blades to said rigid fairing means whereby it is moved with said blades, said connection having provisions for permitting a small angular movement between each blade and the rigid fairing means.

8. In combination in an aircraft, a fuselage, a rotor head, means mounting said rotor head outwardly from said fuselage for rotation, rotor blades, said rotor head having drag hinges for blade attachment which provide for lag-lead movement, means connecting a blade to each of said drag hinges for blade attachment, rigid fairing means enclosing said rotor head, said rigid fairing means having a cutout for each blade, means mounting said rigid fairing member on said drag hinges against tilting relative to said fuselage, said mounting means including means connecting a lever between a plurality of said drag hinges and said rigid fairing means to transmit lag-lead movement of said drag hinges to said rigid fairing means whereby it is moved with said blades, said connecting means including an arrangement whereby each rotor blade is permitted small angular movement relative to its cooperating lever.

9. In combination in an aircraft, a fuselage, a rotor head, means mounting said rotor head outwardly from said fuselage for rotation, rotor blades, said rotor head having drag hinges for blade attachment which provide for lag-lead movement, means connecting a blade to each of said drag hinges for blade attachment, rigid fairing means enclosing said rotor head, said rigid fairing means having a cutout for each blade, a plurality of said drag hinges having an extension which extends downwardly below the rotor head, a lever extending between each drag hinge extension and said rigid fairing means, said levers transmitting lag-lead movement of the drag hinges to said rigid fairing means, the ends of said levers connected to the extending drag hinges providing for small angular movement between the lever and drag hinge.

10. In combination in an aircraft, a fuselage, a rotor head, means mounting said rotor head outwardly from said fuselage for rotation, rotor blades, said rotor head having drag hinges for blade attachment which provide for lag-lead movement, means connecting a blade to each of said drag hinges for blade attachment, rigid fairing means enclosing said rotor head, said rigid fairing means having a cutout for each blade, a plurality of said drag hinges having an extension which extends downwardly below the rotor head, a lever extending between each drag hinge extension and said rigid fairing means, said levers transmitting lag-lead movement of the drag hinges to said rigid fairing means, the ends of said levers connected to the extending drag hinges providing for small angular movement between the lever and drag hinge, the ends of said levers connected to the rigid fairing means providing for relative movement between said levers and rigid fairing means to permit said levers to rotate said rigid fairing means.

11. In combination in an aircraft, a fuselage, a rotor head, means mounting said rotor head outwardly from said fuselage for rotation, rotor blades, said rotor head having drag hinges for blade attachment which provide for lag-lead movement, means connecting a blade to each of said drag hinges for blade attachment, rigid fairing means enclosing said rotor head, said rigid fairing means having a cutout for each blade, a plurality of said drag hinges having an extension which extends downwardly below the rotor head, each of said extensions having splines, and a lever extending outwardly between each drag hinge extension and said rigid fairing means, each lever having splines at one end for mating with the splines of its cooperating drag hinge extension so it will move therewith.

12. In combination in an aircraft, a fuselage, a rotor head, means monuting said rotor head outwardly from said fuselage for rotation, rotor blades, said rotor head having drag hinges for blade attachment which provide for lag-lead movement, means connecting a blade to each of said drag hinges for blade attachment, rigid fairing means enclosing said rotor head, said rigid fairing means having a cutout for each blade, a plurality of said drag hinges having an extension which extends downwardly below the rotor head, each of said extensions having splines, and a lever extending outwardly between each drag hinge extension and said rigid fairing means, each lever having splines at one end for mating with the splines of its cooperating drag hinge extension so it will move therewith, each lever being connected to the rigid fairing means to permit said levers to rotate said rigid fairing means as the levers are moved by the drag hinges.

13. In combination in an aircraft, a fuselage, a rotor head, means mounting said rotor head outwardly from said fuselge for rotation, rotor blades, said rotor head having drag hinges for blade attachment which provide for lag-lead movement, means connecting a blade to each of said drag hinges for balde attachment, rigid fairing means enclosing said rotor head, said rigid fairing means having a cutout for each blade, a plurality of said drag hinges having an extension which extends downwardly below the rotor head, each of said extensions having splines, and a lever extending outwardly between each drag hinge extension and said rigid fairing means, each lever having splines at one end for mating with the splines of its cooperating drag hinge extension so it will move therewith, the splines of each lever being resiliently mounted thereto so that a small amount of relative movement is permitted between drag hinge movement and movement of the rigid fairing means.

14. In combination in an aircraft, a fuselage, a rotor head, means mounting said rotor head outwardly from said fuselage for rotation, rotor blades, said rotor head having members for blade attachment which have lag-lead movement therewith, means connecting a blade to each of said members for blade attachment, rigid fairing means enclosing said rotor head, said rigid fairing means including two cover means, one cover means being positioned over said rotor head and releasably fixed so that it can be removed for access, the other cover means extending from the first cover means and enclosing the remainder of the rotor head between the edge of said one cover means and the fuselage, the other cover means having a cutout for each blade, means mounting said other cover means on said rotor head against tilting relative to said fuselage, said mounting means including a connection which transmits lag-lead movement of said blades to said other cover means whereby it is moved with said blades.

15. In combination in an aircraft, a fuselage, a rotor head, means mounting said rotor head outwardly from said fuselage for rotation, rotor blades, said rotor head having members for blade attachment which have lag-lead movement therewith, means connecting a blade to each of said members for blade attachment, rigid fairing means enclosing said rotor head, said rigid fairing means including two cover means, one cover means being a circular portion positioned over said rotor head and releasably fixed so that while it is fixed to only rotating portions of the rotor head it can be releasably removed for access, the other cover means extending from the first cover means and enclosing the remainder of the rotor head between the circular edge of said one cover means and the fuselage, the other cover means having a cutout for each blade, means mounting said other cover means on said rotor head against tilting relative to said fuselage, said mounting means including a connection which transmits lag-lead movement of said blades to said other cover means whereby it is moved with said blades.

No references cited.

JULIUS E. WEST, *Primary Examiner.*